Oct. 1, 1968 F. J. WOODLEY 3,404,266

FLUID FLOW SIMULATION APPARATUS INCLUDING A FUNCTION-GENERATION CIRCUIT

Filed April 8, 1964 2 Sheets-Sheet 1

Inventor
FRANK JOHN WOODLEY

By Bailey, Stephens & Huettig
Attorney

Oct. 1, 1968 F. J. WOODLEY 3,404,266

FLUID FLOW SIMULATION APPARATUS INCLUDING
A FUNCTION-GENERATION CIRCUIT

Filed April 8, 1964 2 Sheets-Sheet 2

Inventor
FRANK John Woodley
By Bailey, Stephens & Huettig
Attorney 3,404,266

FLUID FLOW SIMULATION APPARATUS INCLUDING A FUNCTION-GENERATION CIRCUIT

Frank J. Woodley, Knebworth, England, assignor to British Aircraft Corporation (Operating) Limited, London, England, a British company Filed Apr. 8, 1964, Ser. No. 358,333
Claims priority, application Great Britain, Apr. 16, 1963, 14,879/63
8 Claims. (Cl. 235—197)

ABSTRACT OF THE DISCLOSURE

To provide an electrical analogue of the expression $E=K_0f(I)$ a curve-forming network of the kind including a network of resistances and biased rectifiers provides different effective resistances for different values of the input voltage, the first resistor of the network being always effective. To permit easy adjustment of the constant $K_0$, a unity gain amplifier of high impedance and having no phase reversal has its input connected to the circuit input through the first network resistor and its output connected to the circuit input through a further resistor, adjustment of which varies the value of $K_0$.

This invention relates to electrical function-generating circuits and has for its object to produce an electrical circuit providing an analogue of the expression $E=K_0f(I)$ of a form such that $K_0$ can easily be altered.

The expression given above can be simulated for a given value of $K_0$ by means of a diode curve-forming network. Such a network consists of a series of resistors, one end of which is connected to the input terminal of the network, the junction between each pair of adjacent resistors being connected to a biasing potential and also through a diode to a base line, the biasing potentials being such that for low input voltages all the diodes are conductive, the first diode effectively short-circuiting the remainder of the circuit, and with increasing input voltage the diodes are cut off in turn beginning with the first, each rendering effective a further one of the series resistors. Thus the slope of the $E—I$ characteristic is altered each time a further diode is cut off and the resultant complete characteristic consists of a number of straight lines approximating the required curve. The first resistance of the series is always in circuit and the voltage across this resistance provides a measure of the resulting current.

With such a circuit if it is desired to alter the value of $K_0$ the valve of each of the resistors has to be altered. A range of values of $K_0$ would thus require several complete sets of resistors in association with multi-pole selector switches.

According to the present invention an input voltage signal is applied through a resistor to a unity gain amplifier of high input impedance having no phase reversal and the output of the amplifier is connected through a further resistance to the input of the circuit, the resistor between the input and the unity gain amplifier constituting at least a part of the first resistor of the diode curve-forming network. With such an arrangement it is found that $K_0$ varies with the value of the further resistor between the output of the amplifier and the circuit input. The output impedance of the unity gain amplifier is preferably of low value.

Such a circuit is of particular importance in the simulation by direct electrical analogue of a water or gas distribution network. In such networks the pipe law connecting the head loss H and the flow rate Q through a pipe are related by the law $H=rQ^n$, where $r$ is the hydraulic resistance of the pipe and $n$ is approximately 2.

In order that the invention may be better understood, one example will now be described with reference to the accompanying drawings in which.

Figure 1:
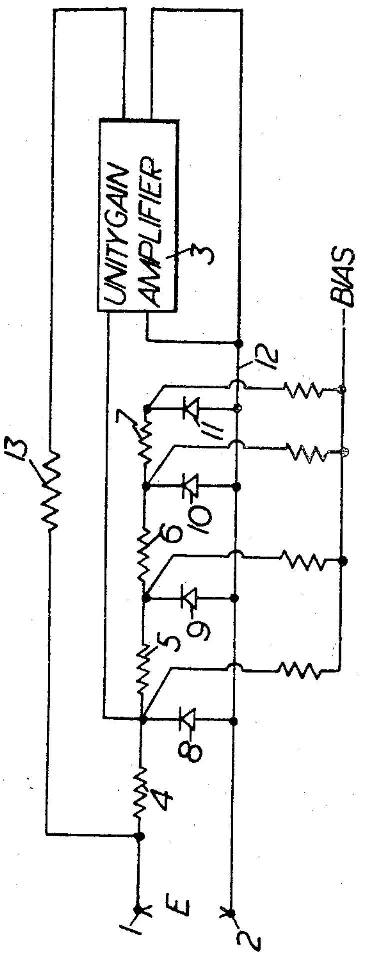
FIGURE 1 illustrates the basic circuit of a device embodying the invention.

The circuit shown in the drawings is intended to simulate the hydraulic resistance of a pipe in a direct-analogue water network distribution analyser. In such an analyser, pipe simulating units of the kind now described, load simulating units and source units are interconnected to form a model of the distribution network under investigation, there being a 1:1 correspondence between the pipe, load and source units in the analogue and the pipes, loads and sources of the real network. In the analogue, electric current represents the rate of flow of water, and electric potential represents the pressure, or head, of water. Currents flow out of the source units, which are stabilised D.C. power units of adjustable output voltage, through the pipe units and are drawn off from the network by the load simulating units. The potential difference for a given flow of current which is observed between the terminals of a pipe unit corresponds to the pressure loss in the real pipe simulated by the unit; the current represents the rate of flow of water through the pipe.

In FIGURE 1, an input voltage E is applied across the input terminals 1 and 2. Terminal 1 is connected to the input of a unity gain amplifier 3 through a resistor 4. The resistor 4 is the first of a series of resistors 4, 5, 6 and 7, the junctions of which are connected through diodes 8, 9, 10 and 11 to the base line 12 connected to the terminal 2. The resistors 4–7 and the diodes 8–11 constitute a curve-forming network of the form described above. For low input voltages all the diodes are conductive and the diode 8 effectively short circuits the remainder of the circuit so that the effective resistance provided by the network is that of the resistor 4. If the input voltage is increased, there will be a point at which the diode 8 will be cut off while the diodes 9, 10 and 11 remain conducting. The effective resistance of the network then will be the sum of the resistors 4 and 5. At a higher input voltage the effective resistance will be the sum of the resistors 4, 5 and 6 and at a still higher voltage the resisto r7 will become effective.

The value of the voltage at the input of the unity gain amplifier, and therefore also at its output is $E—IR_1$ where $R_1$ is the value of the resistor 4. If $R_0$ is the value of the resistor 13, the current flowing through the resistor 13 is equal to $IR_1/R_0$. The amplifier output voltage is thus such as to result in a flow of current through resistor 13 which is proportional to the current I through the diode network. The total current $I_t$ is the sum of these two currents and is therefore $I(1+R_1/R_0)$ and if the curve forming network is such that $E=K_0I^2$ it follows that $$E=\frac{K_0 \cdot I_t^2}{(1+R_1/R_0)^2}$$

Thus the effective value of the constant is $K_0$ divided by the denominator and if the resistor 13 is variable this parameter can be adjusted continuously over a wide range of values.

E corresponds to the quantity H in the law $H=rQ^n$ the total current $I_t$ in FIGURE 1 to the flow rate Q, and the value $K_0$ divided by the denominator to the value $r$ of the hydraulic resistance. Thus the simulated hydraulic resistance can be varied simply by adjusting the resistor 13.

In the above argument, it has been assumed that the value of $n$ is 2. However, the hydraulic resistance law is expressed more accurately if the value of $n$ is assumed to be 1.85.

Figure 2:
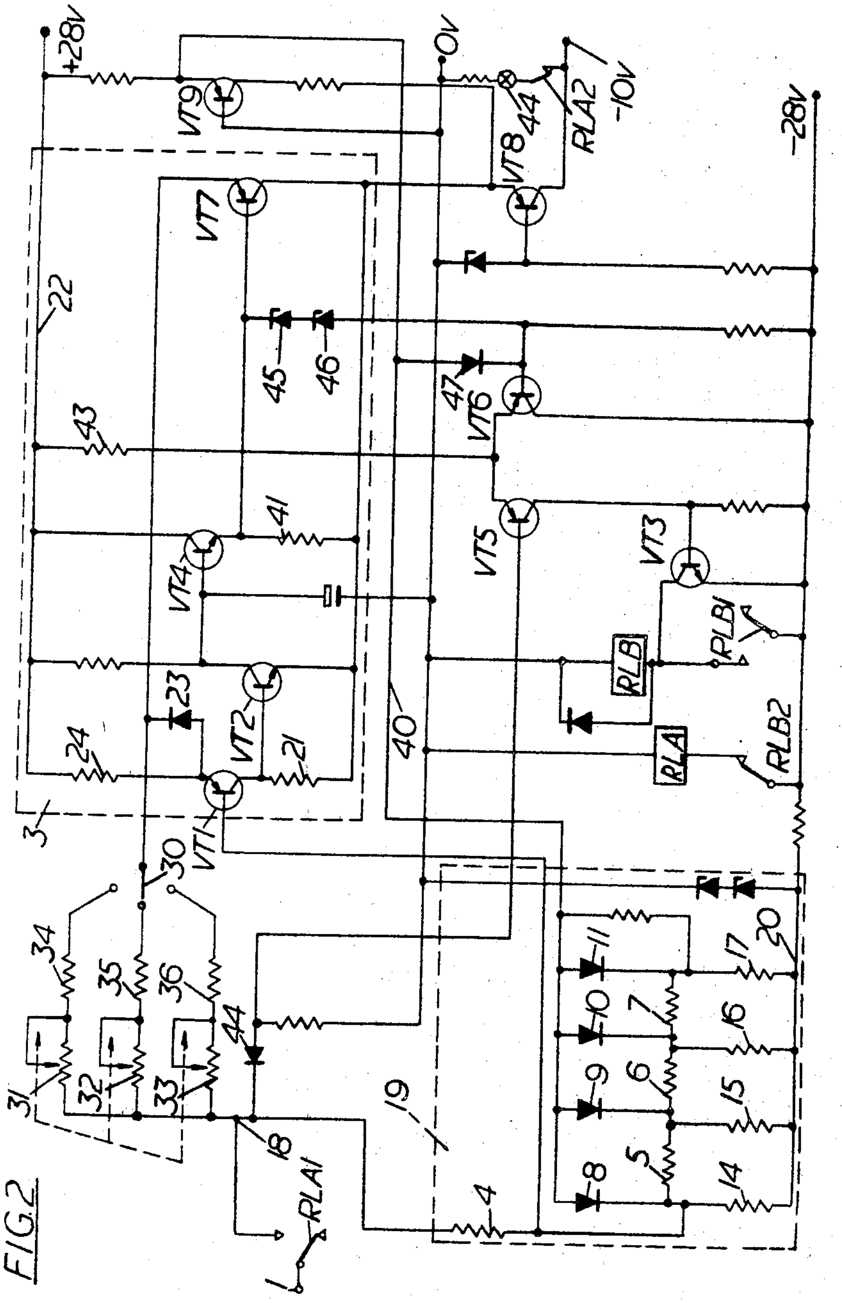
FIGURE 2 shows the circuit details of the device.

Turning now to FIGURE 2 an input signal applied to terminal 1 is passed through the relay contact RLA1 when this is in its closed condition, to the point 18. The point 14 constitutes the input of the curve-forming network 19 consisting of the resistors 4, 5, 6 and 7 and the diodes 8, 9, 10 and 11. Resistors 14, 15, 16 and 17 connect the diode cathodes with a negative supply line 20. As in FIGURE 1, the end of the resistor 4 remote from the input terminal is connected to the input of the unity gain amplifier 3. This input signal is applied to the base of the input transistor VT1 of the amplifier which has its collector connected to the base of transistor VT2 and provides a sign reversal. The collector impedance of transistor VT1 consists of the load resistor 21 in parallel with the input impedance of transistor VT2. The latter transistor is an N-P-N silicon transistor used as a simple amplifier to drive the base of transistor VT4, which is another silicon N-P-N transistor arranged in an emitter follower stage to drive the output transistor VT7 of the amplifier. The collector of transistor VT4 is connected to a positive supply line 22 of 28 volts, which enables input voltages of over 20 volts to be handled. As transistor VT7 is of the P-N-P type and transistor VT4 is an N-P-N type, the base-to-emitter voltages tend to cancel.

Transistor VT7 is a germanium P-N-P power transistor with its collector connected to the emitter of transistor VT8, which is held at a negative potential of approximately −3.9 volts. The negative potential at the collector of transistor VT7 ensures that the output voltage at the emitter of this transmitter is zero when there is no input to the amplifier. The emitter of the power transistor is connected by way of a silicon diode 23 in series with a resistor 24 to the supply conductor 22. The purpose of the diode 23 is to provide a potential which is always about 0.6 volt positive with respect to the emitter of transistor VT7 whatever the voltage of the emitter. The diode is held in a conducting condition by the current through the resistor 24. The junction of the diode 23 and the resistor 24 is connected to the emitter of the input transistor VT1, thereby providing overall negative feedback around the transistors VT1, VT2, VT4, and VT7. The emitter of transistor VT1 being connected to the positive end of the diode 23, and the transistor VT1 being a silicon P-N-P transistor, its base will be at approximately the same potential of transistor VT1 being compensated by similar variations in the silicon diode D8.

If the potential at the base of transistor VT1 were made more positive, then unless the emitter were similarly made more positive the collector current of transistor VT1 would decrease, thus decreasing the base current of transistor VT2. This would cause a large decrease of current through the collector load resistor of transistor VT2 and the base potential of transistor VT4 would become considerably more positive and this change of potential would be transferred through the emitter followers VT4 and VT7 and through the diode 23 to the emitter of transistor VT1. The output emitter potential will therefore closely follow that of the input base.

It will be seen that the feedback tends to maintain constant the input conditions of transistor VT1 despite external disturbances applied to it. This has the effect of increasing the input impedance and the feedback also has the effect of further lowering the emitter impedance of the output emitter follower. To summarise, the amplifier uses feedback in a way such as to produce a high input impedance and low output impedance together with a gain which is very close to unity.

The resistor 13 of FIGURE 1 is replaced in FIGURE 2 by the selector switch 30 and the three resistive paths including respectively the variable resistors 31, 32 and 33 in series with the fixed resistors 34, 35 and 36. In the present example, the values of the three variable resistors are 3000 ohms, 400 ohms and 30 ohms and this gives a wide range of hydraulic resistance simulation. The fixed resistors protect the variable resistors against damage and the fixed resistor 36 associated with the variable resistor of lowest value limits the maximum current passing through the amplifier. The ends of the variable resistors removed from the selector switch are connected through the point 14 to the input terminal 1.

The emitter of a transistor VT9 is connected by way of a conductor 14 to the negative side of the diodes in the curve-forming network and serves to hold the conductor 40 at a slightly positive potential so that, allowing for a small potential drop across the diode 8, the junction of resistor 4 and diode 8 (the amplifier input) is effectively held at zero potential when no external input voltage is applied.

The collector of the power transistor VT7 is connected to the emitter of transistor VT8 which is held at a negative potential of about −3.9 volts. This negative potential at the collector of the power transistor ensures that the output voltage at its emitter is zero when there is no input to the amplifier.

The emitter resistor 41 of transistor VT4, the emitter of transistor VT2 and the collector resistor 21 of the input stage of the amplifier are also connected to the emitter of transistor VT8. By enabling the emitter of transistor VT4 to go slightly negative with respect to earth, the base of VT7 is permitted to become slightly negative and as a consequence the output emitter of transistor VT7 is able to go to zero volts.

The circuit shown in FIGURE 2 provides protection against two fault conditions, namely reverse current in the pipe-cell and an excess of voltage applied across the pipe-cell. The reverse current protection is provided by the transistor VT5 and VT6, which constitute an emitter coupled transistor pair having a common emitter resistor 43, a diode 44, a transistor VT3 and the relays RLA and RLB. When the input to the circuit is reversed in sense, the diode 44 conducts and causes the base of transistor VT5 to become negative, whereupon VTS will pass current. This causes transistor VT3 to conduct heavily and this energizes the relay RLB. The first contact RLB1 of this relay is a holding contact and the second contact operates to de-energize relay RLA, which also has two contacts. The first of these, contact RLA1, opens to isolate the circuit from the input terminal 1 and the second, contact RLA2, energizes an indicator lamp 44.

If the input voltage becomes too high, the emitter of transistor VT4 becomes so positive that the chain of Zener diodes 45 and 46 becomes conductive, causing diode 47 to become non-conductive, with the result that the emitter coupled transistor pair constituted by the transistors VT5 and VT6 is operated to cause transistor VT3 to conduct and to energize the relay system as in the case of reverse current.

The circuit designed above was intended for a water distribution network analyzer and a value of 1.85 was assumed for $n$, in the expression $H=nQ^n$ connecting the head loss H with the flow rate Q through a water pipe. For this value of $r$ the values of the resistors in the curve forming network were as follows:

| | Kilohms |
|---|---|
| Resistor 4 | 10 |
| Resistor 5 | 10.56 |
| Resistor 6 | 25.9 |
| Resistor 7 | 14.2 |
| Resistor 14 | 200 |
| Resistor 15 | 280 |
| Resistor 16 | 340 |
| Resistor 17 | 292 |

I claim:

1. An electrical function-generating circuit comprising: a curve-forming network of the kind including a network of resistances and biased rectifiers arranged to provide a progressively changing number of conductive resistor-rectifier paths in response to a progressively changing input voltage and thereby to provide different effective resistances for different values of the input voltage, the network including a first resistor which is always effective;

a unity gain amplifier of high input impedance having no phase reversal and having its input connected to the input terminal of the circuit through at least a part of the said first resistor of the curve-forming network, the conductive resistor-rectifier paths of the latter being connected across the input of the amplifier;

and a linear resistive connection between the input terminal of the circuit and the output of the unity gain amplifier.

2. A circuit according to claim 1, including, for preventing the circuit from passing reverse current, a pair of emitter-coupled transistors arranged to reverse its condition of conduction when the input signal to the circuit is reversed in sense, and a relay operating in response to the said pair to open a switch contact in the input circuit.

3. A circuit according to claim 1 in which said unity gain amplifier has an input transistor and an output transistor which have a common emitter resistor.

4. A circuit according to claim 1, in which the unity gain amplifier includes an input transistor and a feedback connection to the emitter of the input transistor which includes a diode of the same material as the input transistor, whereby the emitter-base potential of the input transistor is compensated by the potential drop across the diode.

5. A circuit according to claim 1 in which said unity gain amplifier has an input transistor and an output transistor which have a common emitter resistor and, in which the emitter of the output transistor is directly connected through the said further resistor to the input terminal of the circuit.

6. A circuit according to claim 1 including a selector switch for selecting the said further resistance from a number of resistive paths, each of which includes a variable resistance.

7. A circuit according to claim 1 including, for preventing operation of the circuit if the input voltage becomes too high, a Zener diode path, a pair of emitter-coupled transistors arranged to reverse its condition of conduction when the Zener diode path becomes conductive, and a relay operating in response to the change of condition of the said pair to open a switch contact in the input of the circuit.

8. A fluid network distribution analyzer including source-simulating units, load-simulating units and pipe-simulating units connected between the source-simulating units and the load-simulating units, in which each pipe-simulating unit comprises an electrical function-generating circuit including a curve-forming network of the kind including a network of resistances and biased rectifiers arranged to provide a progressively changing number of conductive resistor-rectifier paths in response to a progressively changing input voltage and thereby to provide different effective resistances for different values of the input voltage, the network including a first resistor which is always effective;

a unity gain amplifier of high input impedance having no phase reversal and having its input connected to the input terminal of the circuit through at least a part of the said first resistor of the curve-forming network, the conductive resistor-rectifier paths of the latter being connected across the input of the amplifier; and a linear resistive connection between the input terminal of the circuit and the output of the unity gain amplifier.

References Cited

UNITED STATES PATENTS

| | | | |
|---|---|---|---|
| 2,869,068 | 1/1959 | Morcerf et al. | 330—91 X |
| 2,909,623 | 10/1959 | Blecher | 330—104 X |
| 3,106,684 | 10/1963 | Luik | 330—26 X |
| 3,166,720 | 1/1965 | Rosen et al. | 307—88.5 X |
| 3,207,889 | 9/1965 | Evangelisti et al. | 235—184 |
| 3,209,266 | 9/1965 | White | 307—88.5 X |
| 3,237,002 | 2/1966 | Patmore | 235—197 X |

MALCOM A. MORRISON, *Primary Examiner.*

J. F. RUGGIERO, *Assistant Examiner.*